(12) United States Patent
Wilenski et al.

(10) Patent No.: US 10,662,302 B2
(45) Date of Patent: May 26, 2020

(54) POLYMER NANOPARTICLES FOR IMPROVED DISTORTION CAPABILITY IN COMPOSITES

(71) Applicant: The Boeing Company, Chicago, IL (US)

(72) Inventors: Mark S. Wilenski, Mercer Island, WA (US); Samuel J. Meure, Fishermans Bend (AU); Michael P. Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/493,369

(22) Filed: Sep. 23, 2014

(65) Prior Publication Data
US 2016/0185928 A1      Jun. 30, 2016

(51) Int. Cl.
*C08J 5/10* (2006.01)
*C08J 5/00* (2006.01)
*C08J 5/24* (2006.01)

(52) U.S. Cl.
CPC ........... *C08J 5/10* (2013.01); *C08J 5/005* (2013.01); *C08J 5/24* (2013.01); *C08J 2300/22* (2013.01); *C08J 2300/24* (2013.01); *C08J 2400/22* (2013.01); *C08J 2400/24* (2013.01)

(58) Field of Classification Search
CPC ..... C08L 2205/22; C08L 2205/14; C08J 9/32; C08J 5/04; C08J 5/24; B29C 70/021–023; B05D 1/02; B32B 5/022; B32B 27/20
See application file for complete search history.

(56) References Cited

U.S. PATENT DOCUMENTS

| 3,860,565 A | 1/1975 | Barber, Jr. |
| 3,943,090 A | 3/1976 | Enever |
| 4,306,040 A | 12/1981 | Baer |
| 4,629,759 A | 12/1986 | Rock |

(Continued)

FOREIGN PATENT DOCUMENTS

| CN | 101623266 A | 1/2010 |
| EP | 0378854 | 7/1990 |

(Continued)

OTHER PUBLICATIONS

Sober, D.J. "Kaneka Core-Shell Toughening Systems for Thermosetting Resins" 2007. Accessed at http://www.trfa.org/erc/docretrieval/uploadedfiles/Technical%20Papers/2007%20Meeting/Sober-Kaneka_ppt-Toughening%20of%20Resins.pdf on Jun. 19, 2016.*

(Continued)

*Primary Examiner* — Kara B Boyle

(57) ABSTRACT

A composition may include a resin and a plurality of polymer nanoparticles included in the resin to form a resin mixture. At least some of the polymer nanoparticles may have a greater distortion capability than the resin due to the nature of the polymer backbone of the polymer nanoparticles, and/or due to the nanoparticle free volume being greater than the free volume of the resin, and/or due to the nanoparticle porosity being greater than a porosity of resin. The incorporation of the polymer nanoparticles in the resin may result in an improvement in the strain and/or distortional capability of the resin mixture which may improve the performance of the composite structure.

20 Claims, 11 Drawing Sheets

(56) References Cited

U.S. PATENT DOCUMENTS

| | | |
|---|---|---|
| 4,861,803 A | 8/1989 | Turner |
| 4,954,195 A | 9/1990 | Turpin |
| 5,028,478 A | 7/1991 | Odagiri et al. |
| 5,589,523 A | 12/1996 | Sawaoka |
| 5,605,745 A | 2/1997 | Recker et al. |
| 5,618,857 A * | 4/1997 | Newberth, III ............ C09J 4/00 523/176 |
| 6,503,856 B1 | 1/2003 | Broadway et al. |
| 6,508,897 B1 | 1/2003 | Yamaguchi |
| 6,518,330 B2 | 2/2003 | White et al. |
| 6,740,185 B2 | 5/2004 | Baldwin |
| 6,900,254 B2 | 5/2005 | Wills |
| 7,037,865 B1 | 5/2006 | Kimberly |
| 7,122,250 B2 | 10/2006 | Kinsho et al. |
| 7,435,693 B2 | 10/2008 | Tsotsis et al. |
| 7,645,402 B2 | 1/2010 | Choi et al. |
| 7,655,295 B2 | 2/2010 | Smith et al. |
| 7,678,847 B2 | 3/2010 | Yan et al. |
| 7,738,763 B2 | 6/2010 | Ouderkirk |
| 7,910,636 B2 | 3/2011 | Barker |
| 8,080,313 B2 | 12/2011 | Bonneau et al. |
| 8,283,404 B2 | 10/2012 | Allen |
| 8,288,453 B2 | 10/2012 | Hsu et al. |
| 8,519,505 B2 | 8/2013 | Hiroshige et al. |
| 8,703,630 B2 | 4/2014 | LoFaro et al. |
| 9,517,608 B2 | 12/2016 | Frulloni |
| 2002/0119331 A1 | 8/2002 | Jiang |
| 2003/0039792 A1* | 2/2003 | Hable ................. B32B 5/02 428/59 |
| 2003/0174994 A1 | 9/2003 | Garito et al. |
| 2005/0070666 A1 | 3/2005 | Martin |
| 2005/0255236 A1 | 11/2005 | Deng |
| 2006/0057355 A1 | 3/2006 | Suzuki et al. |
| 2006/0252334 A1* | 11/2006 | LoFaro ................. B32B 5/022 442/400 |
| 2006/0269738 A1 | 11/2006 | Kimberly |
| 2007/0040299 A1 | 2/2007 | Roth |
| 2007/0248827 A1 | 10/2007 | Rukavina |
| 2007/0282059 A1 | 12/2007 | Keller |
| 2008/0176987 A1 | 7/2008 | Trevet et al. |
| 2009/0130376 A1 | 5/2009 | Berkel et al. |
| 2009/0004460 A1 | 6/2009 | Gruber |
| 2009/0292035 A1 | 11/2009 | Semmes |
| 2009/0326137 A1 | 12/2009 | Hsu |
| 2010/0249277 A1 | 9/2010 | Fang |
| 2010/0273382 A1 | 10/2010 | Nandi |
| 2010/0280151 A1 | 11/2010 | Nguyen |
| 2010/0298468 A1 | 11/2010 | Wang |
| 2010/0304119 A1* | 12/2010 | Bonneau ............ C08G 73/06 428/297.4 |
| 2010/0305274 A1 | 12/2010 | Bonneau |
| 2011/0021360 A1 | 1/2011 | Al-Ghamdi |
| 2011/0028308 A1 | 2/2011 | Shah et al. |
| 2011/0097568 A1 | 4/2011 | Kamae |
| 2012/0022185 A1* | 1/2012 | Elgimiabi .......... C08G 59/3218 523/451 |
| 2012/0064283 A1 | 3/2012 | Hill et al. |
| 2013/0029574 A1 | 1/2013 | Van Der Steen |
| 2013/0167502 A1 | 7/2013 | Wilson |
| 2013/0221285 A1 | 8/2013 | Song et al. |
| 2014/0023862 A1 | 1/2014 | Johnson |
| 2014/0038481 A1* | 2/2014 | Chen ................. E04D 1/20 442/59 |
| 2014/0076198 A1 | 3/2014 | Kim |
| 2014/0087178 A1* | 3/2014 | Arai ................. B32B 5/04 428/327 |
| 2014/0199352 A1* | 7/2014 | Lawton ................. B01J 13/06 424/401 |
| 2014/0295723 A1* | 10/2014 | Nelson ................. C08J 5/005 442/59 |
| 2015/0056882 A1 | 2/2015 | Fukuda et al. |
| 2015/0252184 A1 | 9/2015 | Arai |
| 2015/0259493 A1* | 9/2015 | Nederkoorn ........... C08J 9/0061 521/97 |
| 2016/0300810 A1* | 10/2016 | Kanamori ........... H01L 21/6836 |

FOREIGN PATENT DOCUMENTS

| | | | |
|---|---|---|---|
| EP | 1066224 | | 12/2001 |
| EP | 2236549 | A1 | 10/2010 |
| EP | 2886590 | A1 | 6/2015 |
| JP | H11004081 | | 1/1991 |
| JP | H03284988 | | 12/1991 |
| JP | H04363215 | | 12/1992 |
| JP | H11269393 | | 10/1999 |
| JP | 2003166174 | | 6/2003 |
| JP | 2008510844 | | 4/2008 |
| JP | 2010222422 | | 1/2010 |
| JP | 2004162007 | | 6/2010 |
| JP | 2010126702 | | 6/2010 |
| JP | 2010242083 | | 10/2010 |
| JP | 2011157491 | | 8/2011 |
| JP | 2012528236 | | 11/2012 |
| JP | 2013166854 | | 8/2013 |
| WO | WO1999021697 | | 5/1999 |
| WO | WO2009119467 | | 1/2009 |
| WO | WO2010138546 | | 12/2010 |
| WO | WO-2012135754 | A1 * | 10/2012 ............ B32B 27/20 |
| WO | WO2014050264 | | 4/2014 |
| WO | WO 2014073960 | A1 * | 5/2014 ............ C08J 9/0061 |
| WO | WO2014074767 | A1 | 5/2014 |
| WO | WO2015097283 | | 7/2015 |

OTHER PUBLICATIONS

Suzuki, M.; Nagai, A.; Suzuki, M.; Takahashi, A. "Relationship between Structure and Mechanical Property for Bismaleimide-Biscyanamide resin" 1992. J app poly sci, 45, pp. 177-180.*

Fan, H.; Lei, Z.; Pan, J.H.; Zhao, X.S. "Sol-gel synthesis, microstructure and adsorption properties of hollow silica spheres" Materials Letters 65 (2011), 1811-1814.*

Frederick T. Wallenberger, James C. Watson, and Hong Li. "Glass Fibers" 2001 ASM International. All Rights Reserved. ASM Handbook, vol. 21: Composites (#06781G). pp. 27-34.*

Ronald P. White and Jane E. G. Lipson. "Polymer Free Volume and Its Connection to the Glass Transition" Macromolecules 2016, 49, 3987-4007.*

Wallenberger, F.T.; Watson, J.C.; Li, H. Glass Fibers. ASM Handbook, vol. 21: Composites-28/Constituent Materials. pp. 27-34. 2001. (Year: 2001).*

Zhang, X., Zhang, B., Sun, M., Li, J., Wang, L., & Qin, C. (2014). Miscibility, morphology, mechanical, and thermodynamic properties of epoxy resins toughened with functionalized core-shell nanoparticles containing epoxy groups on the surface. Pigment & Resin Technology, 43(1), Jan. 8-18, 2014. (Year: 2014).*

Scifinder "Bisphenol A Epoxy" (Year: 2019).*

Scifinder "Polyethylene Terephthalate" (Year: 2019).*

European Search Report for EP15186490, dated Jan. 22, 2016.

European Search Report for EP15186480, dated Jan. 22, 2016.

Hackett et al., "The Effect of Nanosilica Concentration on the Enhancement of Epoxy Matrix Resins for Prepreg Composites," Society for the Advancement of Material and Process Engineering, 2010.

Nagavarma et al., "Different Techniques for Preparation of Polymeric Nanoparticles—A Review," Asian Journal of Pharmaceutical and Clinical Research, vol. 5, Suppl 3, 2012.

Hydro, et al., Journal of Polymer Science: Part B: Polymer Physics, 45, 1470-1481 (2007).

Diaz, Jairo et al. Thermal Expansion of Self-Organized and Shear-Oriented Cellulose Nanocrystal Films, Biomacromolecules, 2013 14(8), pp. 2900-2908. published online Jul. 10, 2013.

European Search Report for EP15186480.8, dated May 2, 2017.

European Search Report for EP15186480, dated Oct. 31, 2017.

Fu et al., "Effects of particle size, particle/matrix interface adhesion and particle loading on mechanical properties of particulate—

(56) References Cited

OTHER PUBLICATIONS polymer composites," Composites Part B: Engineering, vol. 39, Issue 6, pp. 907-1068, Sep. 2008.
Salviato et al., "Nanoparticle debonding strength: A comprehensive study on interfacial effects," International Journal of Solids and Structures, vol. 50, Issues 20-21, pp. 3225-3232, Oct. 1, 2013.
European Office Action for EP15186480.8, dated May 9, 2018.
European Search Report for EP19175062.9, dated Aug. 16, 2019.
Japanese Patent Office, Japanese Office Action for Application No. 2015162396 dated May 28, 2019.
Japanese Patent Office, Japanese Office Action for Application No. 2015162396 dated Jan. 21, 2020.

* cited by examiner

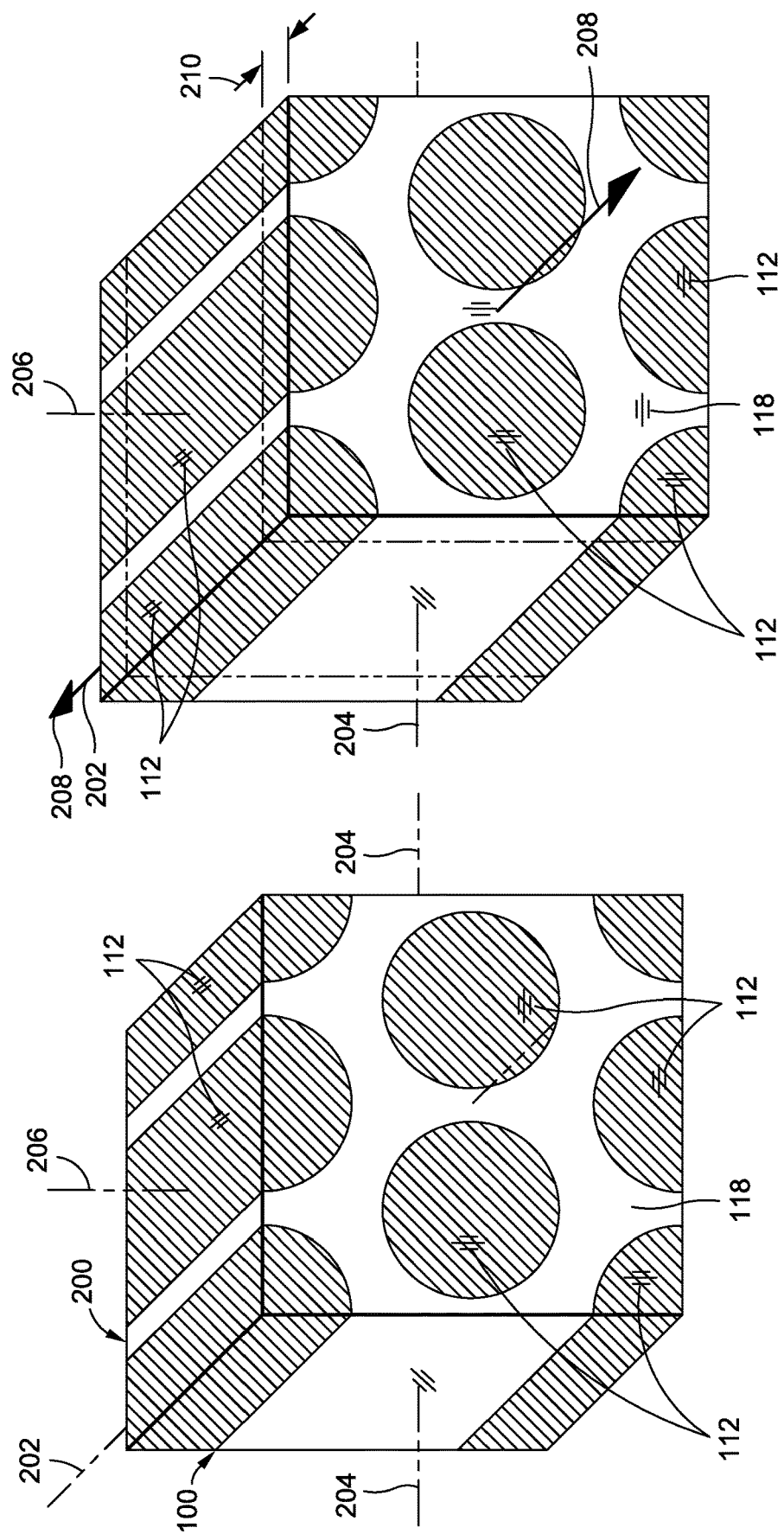

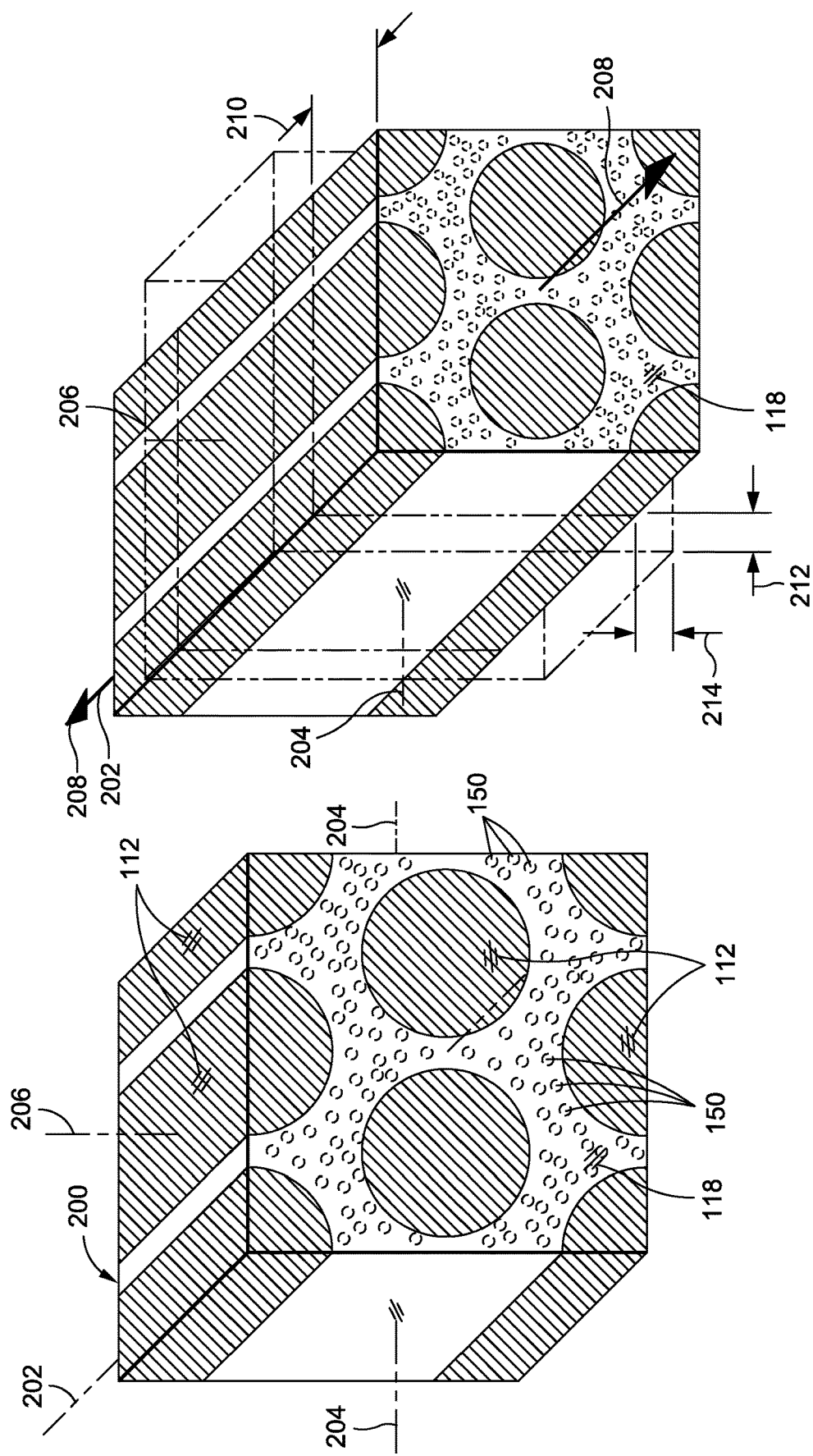

POLYMER NANOPARTICLES FOR IMPROVED DISTORTION CAPABILITY IN COMPOSITES

FIELD

The present disclosure relates generally to composite materials and, more particularly, to the use of nanoparticles in composite structures for improving the strain capability of composite structures.

BACKGROUND

Composite structures typically include reinforcing fibers embedded in a resin matrix. Composite structures are designed to transmit loads along the length of the fibers. The resin matrix holds the fibers in position and may also transfer loads from fiber to fiber by passing the loads through the resin matrix. During the loading of a composite structure, the resin matrix is typically loaded in multiple directions. For example, when a load is placed on a composite structure, the resin matrix may be loaded along a direction parallel to the fibers and also along one or more directions transverse to the fibers. The resin matrix may fail when a certain combination of strains exceeds a predetermined value.

The strain invariant failure theory is a criteria that may be used to predict the combination of strains that will result in failure of the resin matrix in a composite structure. In the strain invariant failure theory, failure occurs when a first strain invariant $J_1$ is exceeded. The first strain invariant $J_1$ is the sum of the three principal strains ($\varepsilon_1+\varepsilon_2+\varepsilon_3$) which are oriented orthogonally relative to one another.

When a standard test coupon is loaded in uniaxial tension, the principal strain $\varepsilon_1$ increases in the tensile direction while the principal strains $\varepsilon_2+\varepsilon_3$ are negative or compressive as the coupon cross-section contracts due to Poisson's ratio. As a result of the ability of the coupon cross-section to contract as the coupon is stretched under the tension load, the principal strain $\varepsilon_1$ may increase to a value significantly higher than if the coupon were unable to contract. In contrast, a material loaded in hydrostatic tension (i.e., $\varepsilon_1=\varepsilon_2=\varepsilon_3$) will fail with a relatively low strain in the three principal directions.

When a load is placed on a composite structure, the reinforcing filaments typically constrain the resin matrix against contraction. The reduced capability of the matrix to contract limits the tensile strain capability of the matrix. As a result of the limit on the strain capability of the matrix, the performance of the composite structure may be limited. For example, when a composite structure is loaded in tension, the relatively low failure strain of the resin may result in failure of the resin (e.g., microcracking) prior to the fibers reaching their failure strain.

As can be seen, there exists a need in the art for a system and method for increasing the strain capability of the resin in a composite structure as a means to improve the performance of the composite structure.

SUMMARY

The above-noted needs associated with the distortion capability of resin in a composite structure are specifically addressed by the present disclosure which provides a composition that may include a resin and a plurality of polymer nanoparticles in the resin to form a resin mixture. At least some of the polymer nanoparticles may have a greater distortion capability than the resin due to the nature of the polymer backbone of the polymer nanoparticles, and/or due to the nanoparticle free volume being greater than the free volume of the resin, and/or due to the nanoparticle porosity being greater than a porosity of resin. The polymer nanoparticles may result in an improvement in the strain and/or distortional capability of the resin mixture which may improve the performance of the composite structure.

In a further embodiment, disclosed is a composite structure which may include a resin containing polymer nanoparticles having a high distortion capability. The composite structure may further include a plurality of reinforcing fibers embedded within the resin mixture. The high distortion capability of the polymer nanoparticles may be due to the nature of the polymer backbone, the nanoparticle free volume, and/or the nanoparticle porosity.

Also disclosed is a method of forming a composition. The method may include providing a resin and mixing a plurality of polymer nanoparticles in the resin to form a resin mixture. The polymer nanoparticles may have a high dilation capability as mentioned above.

In a further embodiment, disclosed is a method of resisting a load applied to a composite structure. The composite structure may contain a cured resin including a plurality of polymer nanoparticles, at least some of which may have a greater distortion capability than the resin due to the polymer backbone of the polymer nanoparticles, due to the polymer nanoparticles having a relatively high free volume, and/or due to the nanoparticle porosity. The method may further include resisting the load with a volumetric strain capability of the resin mixture greater than the volumetric strain capability of resin lacking polymer nanoparticles.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 6 is a schematic perspective illustration of a composite structure containing reinforcing filaments embedded in unmodified resin;

FIG. 6A is a schematic perspective illustration of a tension load applied along a first direction parallel to the length of the reinforcing filaments and illustrating the resulting tensile strain along the first direction and the negligible or non-existent compressive strain of the resin along a second and third directions transverse to the reinforcing filaments;

FIG. 8 is a schematic perspective illustration of a composite structure taken along line 8 of FIG. 4 and illustrating the reinforcing filaments embedded in the resin mixture containing polymer nanoparticles having high distortion capability;

FIG. 8A is a schematic perspective illustration of a tension load applied along a first direction parallel to the length of the reinforcing filaments and illustrating the resulting compressive strain of the resin along the second and third directions transverse to the reinforcing filaments, and further showing the increased tensile strain in the resin mixture along the first direction relative to a lower tensile strain of unmodified resin shown in FIG. 6A;

FIG. 10A is a schematic illustration of biaxial tension applied to the cured resin mixture of FIG. 10A and illustrating the resulting particle strain and the strain of the resin mixture;

DETAILED DESCRIPTION

Figure 1:
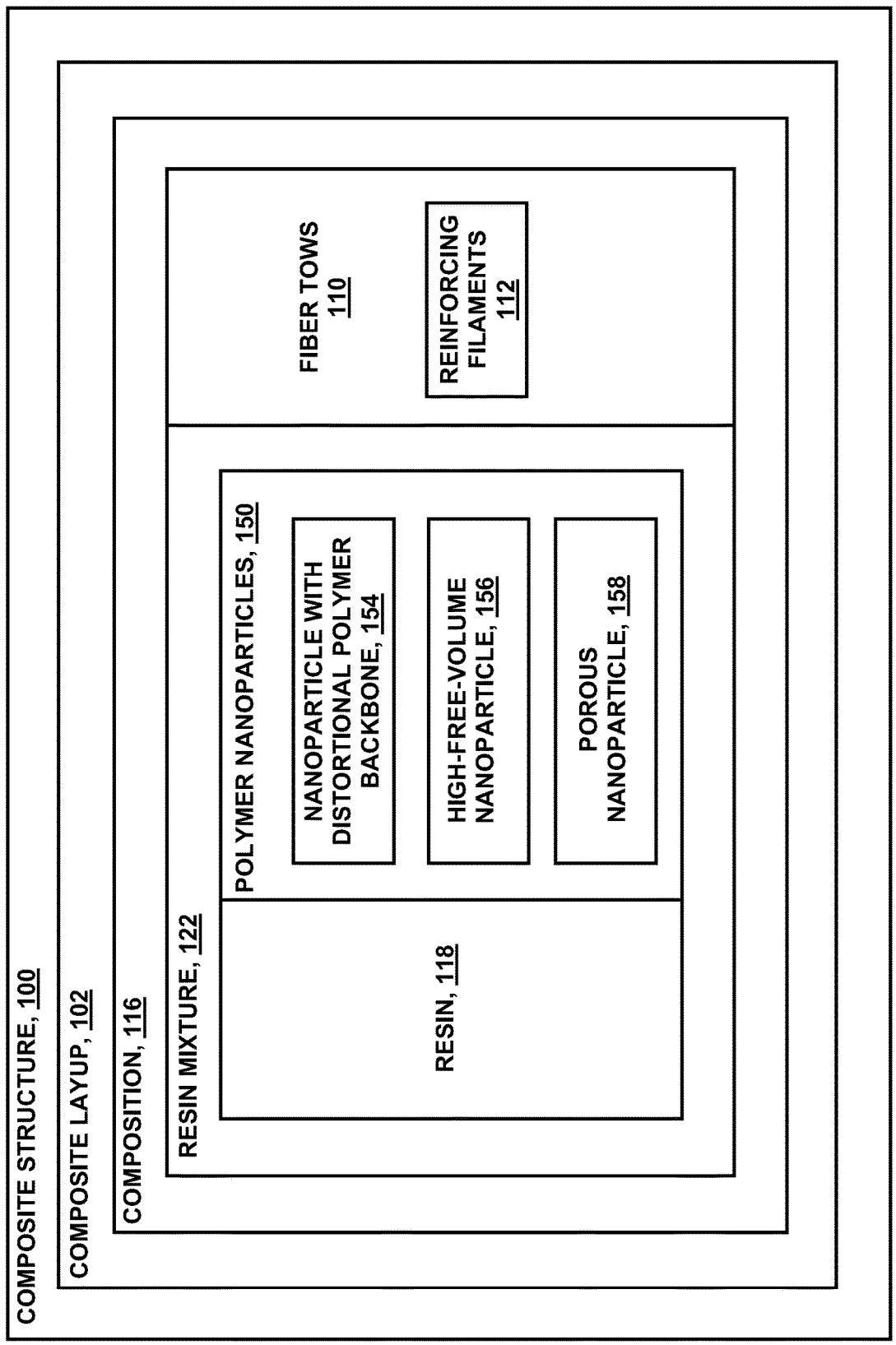
FIG. 1 is a block diagram of a composite structure including resin and fiber tows formed of reinforcing filaments and including polymer nanoparticles providing an increase in the distortional capability of the composite structure.
Figure 2:
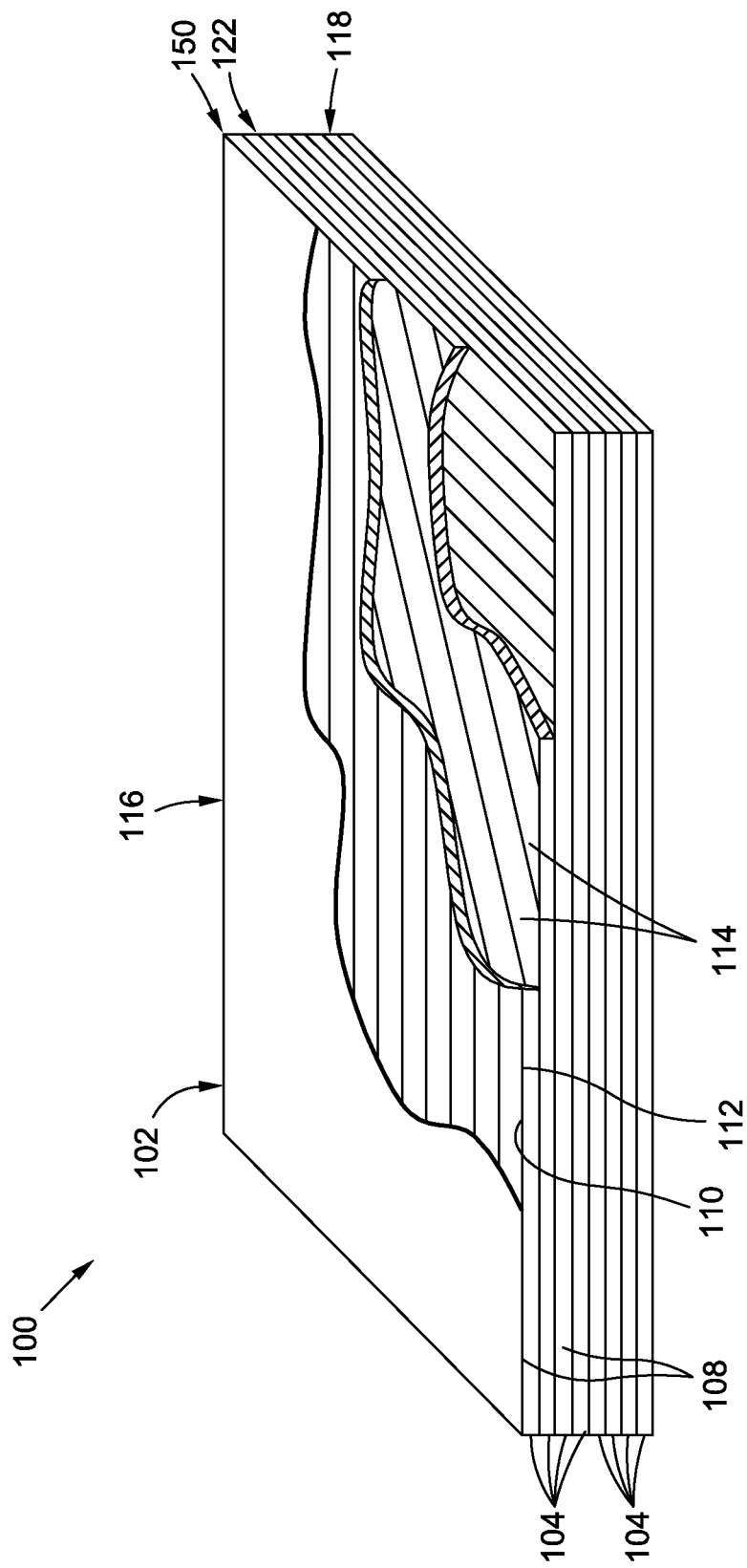
FIG. 2 is a perspective view of a composite structure including a stack of unidirectional plies each formed of a plurality of continuous reinforcing fibers.

Referring now to the drawings wherein the showings are for purposes of illustrating various embodiments of the disclosure, shown in FIG. 1 is a block diagram of a composite structure 100 including a resin mixture 122 comprising resin 118 and high-distortion-capable polymer nanoparticles 150. In some examples, the composite structure 100 may be formed as a composite layup 102 containing one or more composite plies 104 (FIG. 2). A composite layup 102 may include fiber tows 110 embedded in the resin mixture 122. Each one of the fiber tows 110 may be formed of reinforcing filaments 112. Resin 118 may be applied to the fibers 110 such as during prepregging of the fibers 110 and/or during resin infusion of the fibers 110.

Advantageously, the polymer nanoparticles 150 may have a relatively high distortional capability and/or dilational capability. For example, the material composition 116 of the polymer nanoparticles 150 may have a greater volumetric distortion capability and/or a higher failure strain than cured, unmodified resin 118. In the present disclosure, unmodified resin 118 may be described as resin 118 that does not contain high-distortion-capable polymer nanoparticles 150. The relatively high distortional capability of the polymer nanoparticles 150 may be due to the nature of the polymer backbone 154 of the polymer nanoparticle material. In another example, the relatively high distortional capability of the polymer nanoparticles 150 may be due to a nanoparticle free volume that may be greater than the free volume of unmodified resin 118.

In a further example, the relatively high distortional capability of the polymer nanoparticles 150 may be due to a nanoparticle porosity of the polymer nanoparticles 150 which may be greater than the porosity of unmodified resin 118. The relatively high distortional and/or dilational capability of the polymer nanoparticles 150 may result in an improvement in the strain capability and/or distortional capability of the resin mixture 122 relative to the strain and/or distortional capability of unmodified resin 118. Improving the strain and/or distortional capability of the resin mixture 122 may result in an improvement in the performance of the composite structure 100, such as the load-carrying capability or the stiffness characteristics of the composite structure 100.

Advantageously, the high-distortion-capable polymer nanoparticles 150 may be provided in a relatively small particle cross-sectional width 152 relative to the filament cross-sectional width of the reinforcing filaments 112. For example, the polymer nanoparticles 150 may have a particle cross-sectional width 152 of 10-200 nanometers, and the reinforcing filaments 112 may have a filament cross-sectional width of 5-30 microns. Furthermore, the polymer nanoparticles 150 may be provided in a generally rounded or spherical shape. The relatively small size of the polymer nanoparticles 150 and/or the generally rounded or spherical shape may allow the polymer nanoparticles 150 to be added to the resin 118 at relatively high load levels with a minimal increase in the viscosity of the resin mixture 122 relative to the viscosity of unmodified resin 118. In one example, the polymer nanoparticles 150 may constitute up to 75 percent by volume of the resin mixture 122. A relatively low viscosity of the resin mixture 122 may facilitate processing of the composite layup 102 and may facilitate resin flow through the fiber bed.

FIG. 2 is a schematic illustration of a composite structure 100 made up of a stack of composite plies 104 including fibers 110 and a plurality of high-distortion-capable polymer nanoparticles 150 embedded in resin 118. In the example shown, the composite plies 104 are configured as unidirectional plies 108. Each one of the unidirectional plies 108 may include generally parallel, continuous reinforcing fibers 110 or fiber tows 110. In one example, a unidirectional ply 108 may be made up of a plurality of unidirectional tapes 114 or fiber tows 110 arranged side by side. Each one of the fiber tows 110 may be made up of a bundle of several 1000 reinforcing filaments 112. For example, a single fiber tow 110 may include up to 100,000 or more reinforcing filaments 112. In some examples, a reinforcing filament may have a filament cross-sectional width or diameter of 5-30 microns. For example, a carbon reinforcing filament may have a filament cross-sectional width of approximately 5-7 microns. Glass reinforcing filaments may have a filament cross-sectional width of 10-25 microns. In the present disclosure, the terms fiber, composite fiber, reinforcing fiber, and fiber tow may be used interchangeably.

Although FIG. 2 illustrates a composite layup 102 formed of unidirectional plies 108, a composite layup 102 may be provided using composite plies 104 of any one of a different variety of fiber forms including, but not limited to, unidirectional tape, woven fabric, braided fibers, stitched fiber forms, chopped fiber forms, and any other type of crimp and non-crimp fiber forms. Regardless of the configuration of the fibers 110 in a composite layup 102, the resin 118 may advantageously include a plurality of high-distortion-capable polymer nanoparticles 150 which may improve the strain capability of the resin mixture 122. In addition, the high-distortion-capable polymer nanoparticles 150 may be included in resin mixture 122 for applications that do not include reinforcing fibers 110 or reinforcing filaments 112. For example, high-distortion-capable polymer nanoparticles 150 may be included in resins used as adhesives, coatings, injection moldable plastic, and other applications.

Figure 3:
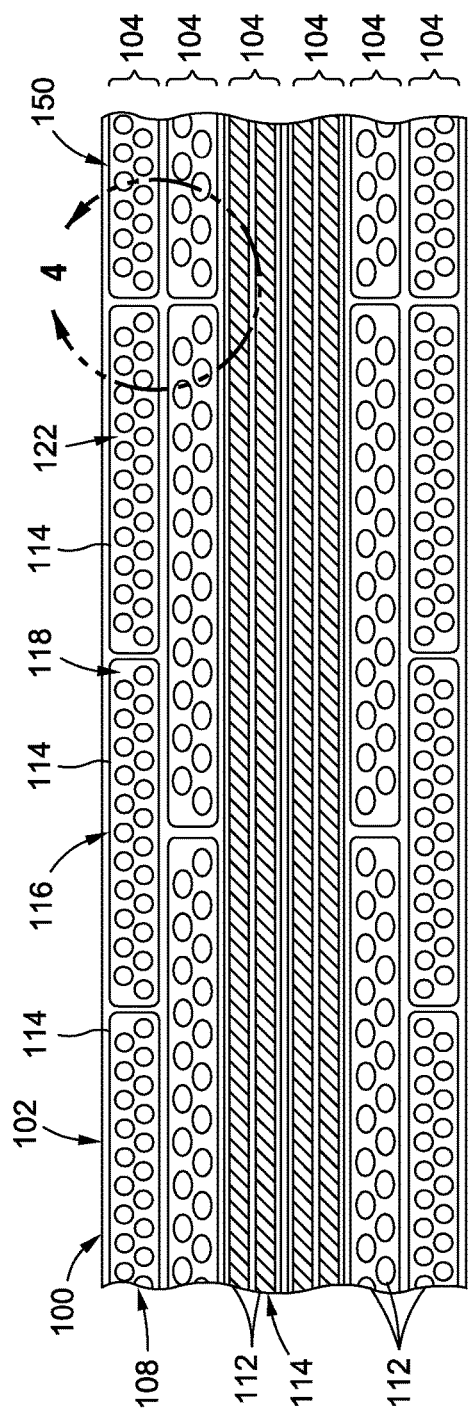
FIG. 3 shows a cross-section of a portion of a composite structure showing reinforcing filaments of the unidirectional composite plies oriented at different angles.

FIG. 3 shows a cross-section of a portion of the composite structure 100 of FIG. 2 and illustrating the reinforcing filaments 112 of the unidirectional plies 108 oriented at different angles. For example, the middle two composite plies 104 may include reinforcing filaments 112 that may be oriented parallel to the plane the paper. The uppermost and lowermost composite plies 104 may be oriented along a direction perpendicular plane the paper. The composite plies 104 located between the middle and uppermost composite ply 104 and between the middle and lowermost composite ply 104 may contain reinforcing filaments 112 that may be oriented non-parallel and non perpendicular to the plane of the paper. However, any one of the composite plies 104 may include reinforcing fibers 110 oriented at any angle relative to the reinforcing filaments 112 of other composite plies 104 in the composite layup 102. Furthermore, any one of the composite plies 104 may be provided in a fiber form other than unidirectional tape.

A composite structure 100 such as that which is illustrated in FIG. 2 may be formed by laying up a stack of composite plies 104. In one example, the composite plies 104 may be pre-impregnated with a resin mixture 122 (e.g., prepreg composite plies). The resin mixture 122 may contain high-distortion-capable polymer nanoparticles 150. Heat may be applied to the stack of prepreg composite plies 104 to reduce the viscosity of the resin mixture 122 and thereby allow the resin mixture 122 to flow and intermingle with the resin mixture 122 of adjacent composite plies 104. Heat and/or pressure may be applied to cure and/or solidify the resin mixture 122 of the prepreg composite plies 104. The composite layup 102 may be actively or passively cooled to result in a composite structure 100.

Polymer nanoparticles 150 having high distortion capability may be applied to the composite plies 104 prior to or during pre-pregging operations. In some examples, the polymer nanoparticles 150 may be applied to fiber tows 110, unidirectional tape, woven fabric, or other fiber forms in a manner such that the polymer nanoparticles are embedded within or between the reinforcing filaments 112 that make up each fiber 110 tow. For example, polymer nanoparticles 150 may be sprayed onto the reinforcing filaments 112 of a moving fiber tow 110 prior to forming the fiber tow 110 into a prepreg fiber forms such as prepreg unidirectional tape, prepreg unidirectional sheet, prepreg woven fabric, prepreg braided fibers 110, and other prepreg fiber forms.

Alternatively, a composite layup 102 may be formed by stacking dry fiber composite plies 104. The dry fiber composite plies 104 may be infused with a resin mixture 122 containing high-distortion-capable polymer nanoparticles 150. The resin mixture 122 may be infused into the dry fiber composite plies 104 using a suitable resin infusion process. For example, a resin mixture 122 containing high-distortion-capable polymer nanoparticles 150 may be infused into dry fiber composite plies 104 using vacuum assisted resin transfer molding (VARTM), controlled atmospheric pressure resin infusion (CAPRI), or any one of a variety of other resin transfer processes. After infusion of the resin mixture 122, the composite layup 102 may be consolidated. Heat and/or pressure may be applied to the composite layup 102 to cure and/or solidify the resin mixture 122 to form a composite structure 100.

In any of the examples disclosed herein, the resin 118 and/or the polymer nanoparticles may be formed of thermoplastic material and/or thermosetting material. Thermoplastic material may include acrylics, fluorocarbons, polyamides, polyolefins (e.g., polyethylenes, polypropylenes), polyesters, polycarbonates, polyurethanes, polyaryletherketones (e.g., polyetheretherketone (PEEK), polyetherketoneketone (PEKK), polyetherketoneetherketone (PEKEK), etc.), polyetherimides, polyethersulfone, polysulfone, and/or polyphenylsulfone. Thermosetting material may include polyurethanes, phenolics, polyimides, sulphonated polymer (polyphenylene sulphide), a conductive polymer (e.g., polyaniline), benzoxazines, bismaleimides, cyanate esthers, polyesters, epoxies, and/or silsesquioxanes. The reinforcing filaments 112 may be formed from materials such as carbons, silicon carbide, boron, ceramic, and metallic material. The reinforcing filaments 112 may also be formed from glass such as E-glass (alumino-borosilicate glass), S-glass (alumino silicate glass), pure silica, borosilicate glass, optical glass, and other glass compositions.

Figure 4:
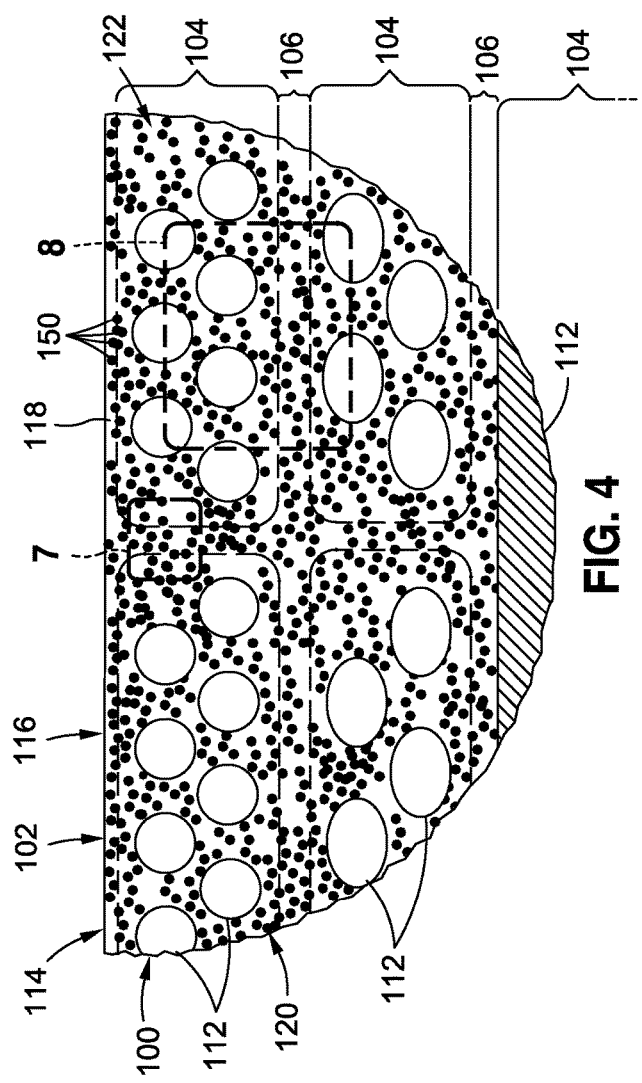
FIG. 4 is an enlarged view of a portion of the composite structure taken along line 4 of FIG. 3 and showing a plurality of polymer nanoparticles in the resin.

FIG. 4 shows a portion of the composite structure 100 of FIG. 3 and illustrating a plurality of high-distortion-capable polymer nanoparticles 150 in the resin mixture 122. As can be seen, the polymer nanoparticles 150 may have a relatively small particle cross-sectional width 152 relative to the filament cross-sectional width of the reinforcing filaments 112. In the example shown, the polymer nanoparticles 150 may be uniformly distributed throughout the composite layup 102. For example, the polymer nanoparticles 150 may be included between the reinforcing filaments 112 of each one of the unidirectional tapes 114. Furthermore, the polymer nanoparticles 150 may be included in the interlaminar regions 106 between adjacent composite plies 104. Even further, polymer nanoparticles 150 may be included in the spaces between the opposing side edges of adjacent pairs of unidirectional tapes 114 in a composite ply 104.

In this regard, a composite layup 102 may be formed of prepreg unidirectional tape 114 containing polymer nanoparticles 150 surrounding the reinforcing filaments 112 and/or embedded between the reinforcing filaments 112 of the unidirectional tape. During processing of the composite layup 102, heat may be applied to the resin mixture 122 to reduce the viscosity of the resin 118 allowing the resin mixture 122 of each one of the prepreg unidirectional tapes 114 to flow and intermingle with the resin mixture 122 of unidirectional tapes 114 in the same composite ply 104 and in adjacent composite plies 104. The intermingling of the resin mixture 122 may result in the polymer nanoparticles 150 becoming generally uniformly distributed throughout the composite layup 102.

However, in other examples, polymer nanoparticles 150 may be selectively applied to target locations during and/or following the layup of the unidirectional plies 108 of a composite layup 102. The high-distortion-capable polymer nanoparticles 150 may be applied to resin-rich pockets of the composite layup 102. A resin-rich pocket may contain a relatively high volume of resin 118 relative to the volume of fibers 110 at that location of the composite layup 102. In other examples, high-distortion-capable polymer nanoparticles 150 may be applied predominately within a fiber bed such as within or between the reinforcing filaments 112 that make up a fiber tow 110 or composite ply 104. Even further, polymer nanoparticles may be selectively applied to certain regions of a composite layup 102, while other regions of the composite layup 102 may be devoid of polymer nanoparticles 150. For example, polymer nanoparticles 150 may be applied to one or more of the interlaminar regions 106 of a composite layup 102, and the remaining regions of the composite layup 102 may be devoid of polymer nanoparticles 150.

Figure 5A:
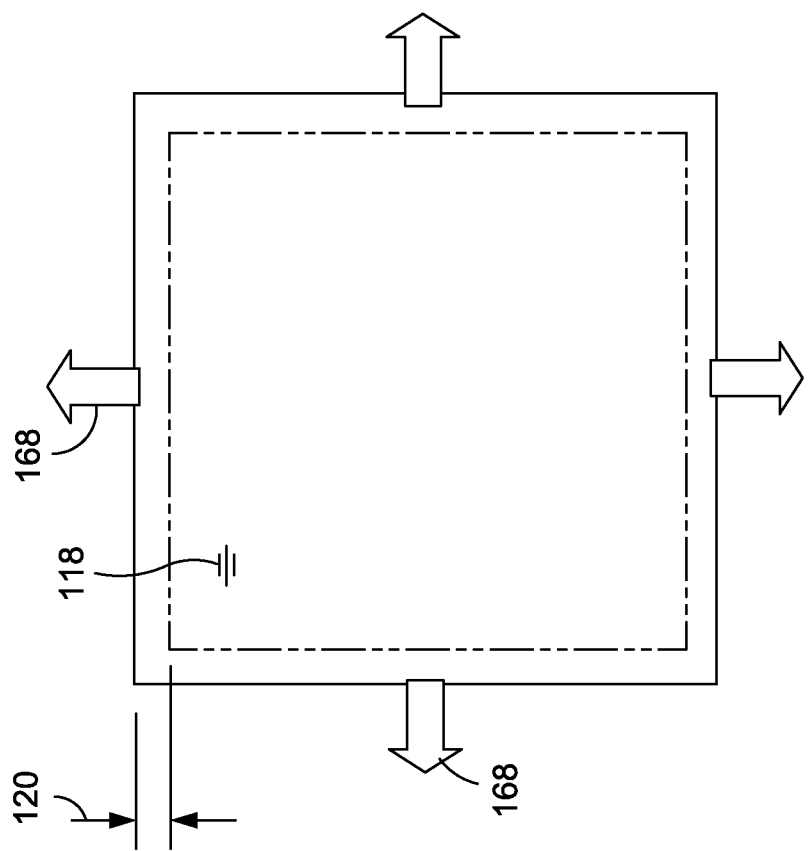
FIG. 5A is a schematic illustration of biaxial tension applied to the cured unmodified resin and the resulting resin strain uniformly distributed throughout the resin.
Figure 5:
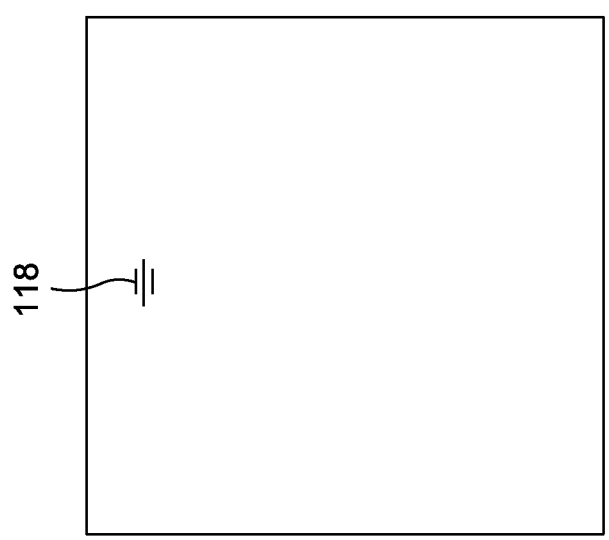
FIG. 5 is a schematic illustration of a cured unmodified resin and illustrating the unmodified resin devoid of polymer nanoparticles.

FIG. 5 is a schematic illustration of a unit cell of cured unmodified resin 118 and illustrating the unmodified resin 118 being devoid of polymer nanoparticles. Unmodified resin 118 may be formed of thermosetting material which may have a lower failure strain or may be more brittle than thermoplastic resin 118. FIG. 5A is a schematic illustration of the application of biaxial tension 168 to the cured unmodified resin 118 and showing the resin strain 120 uniformly distributed in all directions throughout the unmodified resin 118.

FIG. 6 is a schematic perspective illustration of a representative block 200 of a composite structure 100 containing reinforcing filaments 112 embedded in unmodified resin 118. The reinforcing filaments 112 are shown oriented along a first direction 202 of the representative block 200. Also shown in FIG. 6 is a second direction 204 oriented orthogonal to the first direction 202, and a third direction 206 oriented orthogonal to the first and second direction 204s. FIG. 6A is a schematic perspective illustration of a uniaxial tension load 208 applied to the representative block 200 of FIG. 6 along the first direction 202 parallel to the reinforcing filaments 112, and illustrating the resulting tensile strain 210 along the first direction 202. Due to the reinforcing filaments 112 constraining the unmodified resin 118 against contraction along the second direction 204 and third direction 206, the representative block 200 of composite structure 100 exhibits a relatively small strain along the second and third directions 204, 206. As indicated above, the reduced capability of the unmodified resin 118 to contract or strain along directions transverse to the tensile load direction limits the strain of the reinforcing filaments 112 which detracts from the performance of the composite structure 100.

Figure 7A:
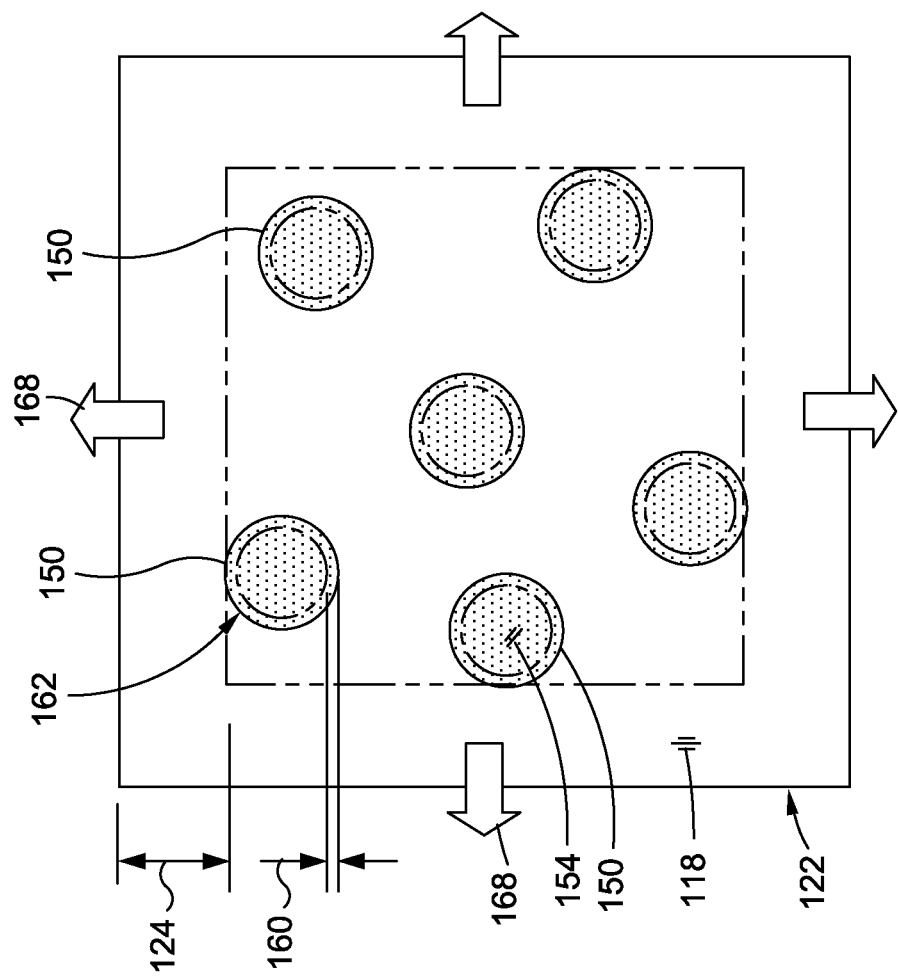
FIG. 7A is a schematic illustration of biaxial tension applied to the cured resin mixture in the same magnitude as the biaxial tension applied in FIG. 5A, and illustrating the nanoparticle strain and the increased strain of the resin mixture relative to the strain of unmodified resin shown in FIG. 5A.
Figure 7:
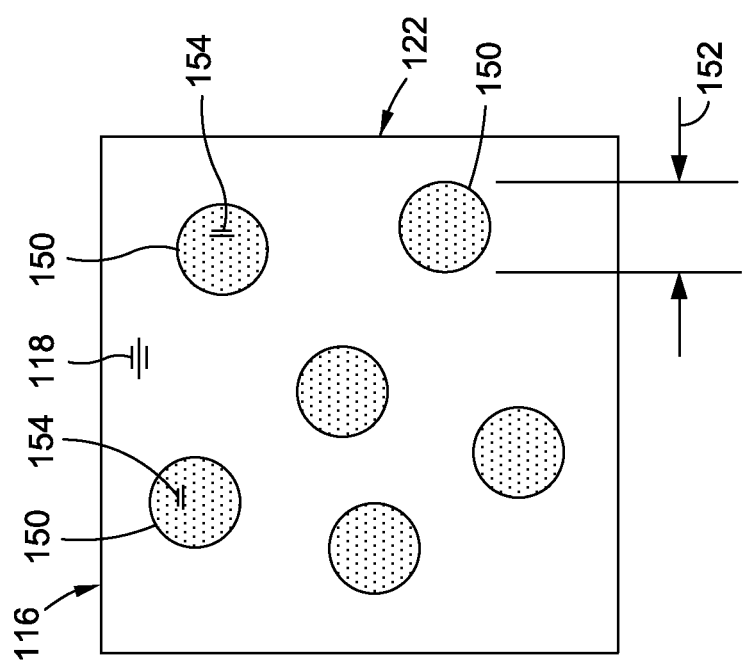
FIG. 7 is a schematic illustration of a cured resin mixture taken along line 7 of FIG. 4 and illustrating the resin containing a plurality of polymer nanoparticles having high distortion capability.

FIG. 7 is a schematic illustration of a unit cell of cured resin mixture 122 taken along line 7 of FIG. 4 and illustrating a plurality of polymer nanoparticles 150 having high distortion capability in the resin mixture 122. In this regard, the cured resin mixture 122 may have a strain capability along at least one direction that is greater than the strain capability of unmodified resin 118. As indicated above, the high-distortion-capable polymer nanoparticles 150 may be characterized as having a greater distortion capability than unmodified resin 118. For example, the polymer nanoparticles 150 may have an inherently high distortional capability due to the nature of the polymer backbone 154 of the material composition 116 (e.g., polyurethane, ethylene propylene rubber) of the polymer nanoparticles 150.

As indicated above, the high-distortion-capable polymer nanoparticles 150 may be provided in a relatively small particle cross-sectional width 152 or diameter of approximately 10-200 nanometers. In some examples, the polymer nanoparticles may have a cross-sectional width of between 10-100 nanometers. However, for certain applications, the polymer nanoparticles may have a cross-sectional width of up to 2 microns. Advantageously, a relatively small particle cross-sectional width 152 of the polymer nanoparticles 150 may advantageously prevent the filtering out of overly-large nanoparticles that may otherwise occur during prepregging operations or resin infusion. In this regard, overly-large nanoparticles may be prevented from passing between reinforcing filaments 112 during resin flow.

In some examples, a resin mixture 122 may contain polymer nanoparticles 150 that may all have substantially the same particle cross-sectional width 152. However, in other examples, it may be desirable that some of the polymer nanoparticles 150 have a particle cross-sectional width 152 that is different than the particle cross-sectional width 152 of other polymer nanoparticles 150 in the resin mixture 122. Furthermore, in addition to high-distortion-capable polymer nanoparticles 150, a resin mixture 122 may include polymer nanoparticles that may have a different functionality than providing high distortion capability. For example, at least some of the polymer nanoparticles in a resin mixture 122 may be formed of thermoplastic material which may have a higher toughness than the toughness of unmodified resin 118.

For example, in addition to high-distortion-capable polymer nanoparticles 150, a resin mixture 122 may also contain thermoplastic polymer nanoparticles (not shown) that may be at least partially soluble in resin 118 such that prior to or during resin cure and after the majority of the resin flow through a composite layup 102, the thermoplastic polymer nanoparticles may fully or partially dissolve in the resin mixture 122. As a result of the dissolution of the thermoplastic polymer nanoparticles, the resin mixture 122 may have an increased toughness relative to the toughness of cured, unmodified resin 118. The increased toughness of the resin mixture 122 may reduce or prevent crack initiation or crack growth within the composite structure 100 such as during thermal cycling and/or during mechanical loading of the composite structure 100 during its service life. In an embodiment, at least some of the polymer nanoparticles 150 may be contained within a sheath (not shown) that may capable of transferring load between the resin 118 and the polymer nanoparticle 150. In other examples, the sheath may be at least partially soluble in the resin 118. For example, the sheath may be thermoplastic such that the dissolution of the sheath results in an improvement in the toughness of the cured resin 118.

The high-distortion-capable polymer nanoparticles 150 and/or other types of polymer nanoparticles may preferably be provided in a rounded or spherical shape as a means to reduce the effect of the polymer nanoparticles on the viscosity of the resin mixture 122. A generally rounded or spherical shape of the polymer nanoparticles may allow the nanoparticles to slip between reinforcing filaments 112 during resin infusion or resin flow, and may avoid interlocking of the polymer nanoparticles with reinforcing filaments 112 or with other polymer nanoparticles as may otherwise occur with non-spherical or complexly-shaped nanoparticles that have sharp edges or corners. However, the polymer nanoparticles may also be provided in non spherical shapes. For example, the polymer nanoparticles may provided in generally rounded shapes such as oblong or elliptical shapes, or as a three-dimensional faceted shapes including, but not limited to, cubes, rectangles, pyramids, and other shapes.

The rounded or spherical shape of the polymer nanoparticles and/or the relatively small particle cross-sectional width 152 may allow for relatively high concentrations of polymer nanoparticles within the resin mixture 122 with relatively small effects on resin viscosity. In some examples, the polymer nanoparticles 200 may constitute up to 75 percent by volume of a resin mixture 122 containing resin 118 and polymer nanoparticles 200. Preferably, the polymer nanoparticles 200 may constitute a minimum of 10 percent by volume of a resin mixture 122 as the low end of a range of volumetric percentage of polymer nanoparticles 200. However, in some examples, the polymer nanoparticles 200 may constitute no less than 5 percent by volume at the low end of the range. In still other examples, the polymer nanoparticles 200 may constitute no less than 10 percent by volume of the resin mixture 122 at the low end of the range. In further examples, the polymer nanoparticles 200 may constitute no less than 15 percent by volume at the low end of the range.

In certain applications, it may be desirable to provide the polymer nanoparticles 200 at a maximum of 65 percent by volume of a resin mixture 122 as a high end of a range of percentage by volume of polymer nanoparticles 200. However, in some examples, the polymer nanoparticles 200 may constitute no more than 50 percent by volume as the high end of the range. In certain applications, polymer nanoparticles 200 may be provided in any combination of the above-mentioned low end and high end of the range of volumetric percentage of polymer nanoparticles 200 of a resin mixture 122. Non-limiting examples of combinations of the above-mentioned low end and high end of a range of percentage by volume of polymer nanoparticles 200 include an arrangement wherein the polymer nanoparticles 200 constitute from 5-75 percent by volume of a resin mixture 122. Another example may include polymer nanoparticles 200 that constitute from 10-75 percent by volume of a resin mixture 122. In still other examples, the polymer nanoparticles 200 may constitute from 15-65 percent by volume of a resin mixture 122. In an even further example, the polymer nanoparticles 200 may constitute from 20-50 percent by volume of a resin mixture 122. Advantageously, the generally rounded or spherical shape of the polymer nanoparticles 200 allows for linear improvements in the resin 118 properties with linear increases in the concentration level of polymer nanoparticles 200 in the resin 118 with minimal or negligible effect on resin viscosity.

FIG. 7A is a schematic illustration of biaxial tension 168 applied to the cured resin mixture 122 of FIG. 7 in the same magnitude as the biaxial tension 168 applied to the unmodified resin 118 of FIG. 5A. In response to application of the biaxial tension 168 load, the high-distortion-capable polymer nanoparticles 150 may exhibit nanoparticle dilation 162. In this regard, dilation or expansion of the polymer nanoparticles 150 may allow for an increase in the strain of the resin 118 matrix relative to the strain of unmodified resin 118 shown in FIG. 5A. In FIG. 7A, the strain of the resin mixture 122 is shown extending uniformly in all directions. The regions of resin 118 between the polymer nanoparticles may distort due to Poisson's ratio and resulting in increased strain capability of the resin 118 matrix.

FIG. 8 is a schematic perspective illustration of a representative block 200 of a composite structure 100 containing reinforcing filaments 112 embedded in a resin mixture 122 containing polymer nanoparticles 150 having high distortion capability as described above. In the example shown, the polymer nanoparticles 150 may be substantially uniformly distributed throughout the resin 118 matrix and may be located between the reinforcing filaments 112 of individual fiber 110 tows (FIG. 2) and/or between adjacently-disposed fiber 110 tows of a composite layup 102. FIG. 8A is a schematic perspective illustration of a uniaxial tension load 208 applied to the representative block 200 along a first direction 202 parallel to the length of the reinforcing filaments 112. Also shown is the resulting compressive strain 212, 214 of the resin mixture 122 along the both the second and third directions 204, 206. Advantageously, the effect of nanoparticle distortion of the plurality of polymer nanoparticles 150 allows for distortion of the regions of resin mixture 122 between the polymer nanoparticles 150 due to Poisson's ratio. The result is an increase in the tensile strain 210 of the representative block 200 of the composite structure 100 along the first direction 202 relative to a lower amount of tensile strain 210 of the representative block 200 shown in FIG. 6A. The increased strain capability as a result of the nanoparticle distortion may result in an increase in the performance of the composite structure 100.

Figure 9A:
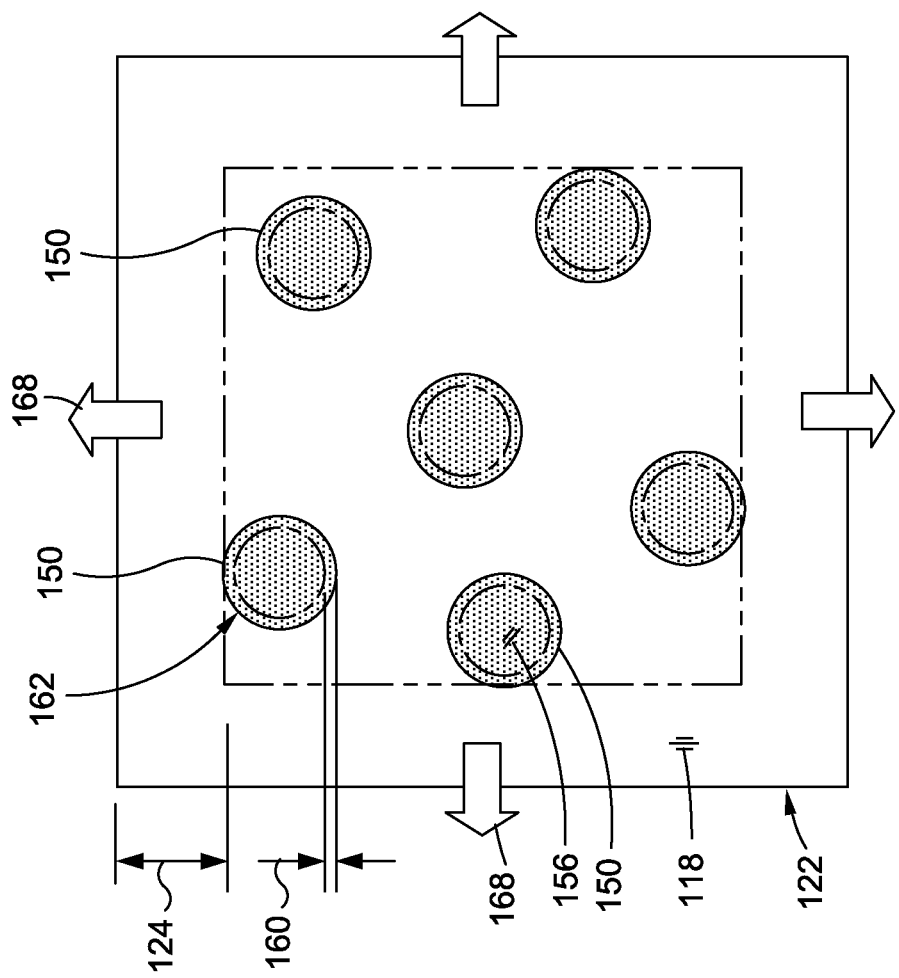
FIG. 9A is a schematic illustration of biaxial tension applied to the cured resin mixture of FIG. 9A and illustrating the resulting particle strain and the strain of the resin mixture.
Figure 9:
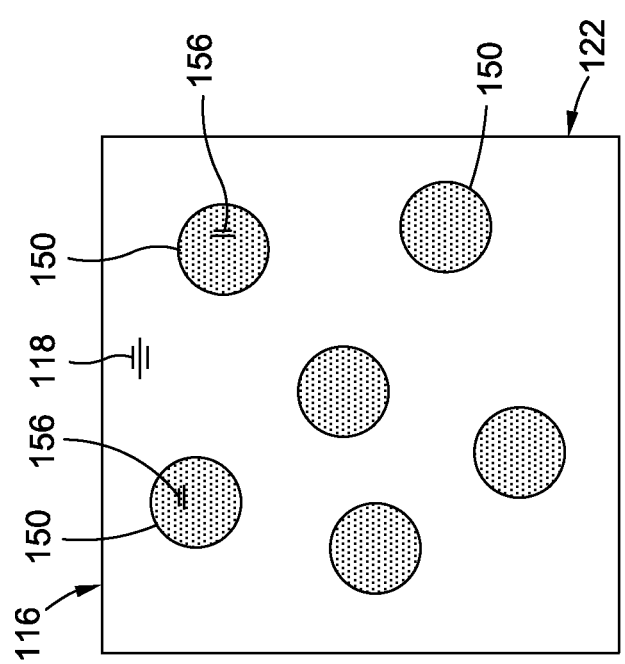
FIG. 9 is a schematic illustration of a cured resin mixture comprising resin containing polymer nanoparticles having a high free volume.

FIG. 9 is a schematic illustration of an embodiment of a unit cell of cured resin mixture 122 containing high-free-volume polymer nanoparticles 156 having a nanoparticle free volume that may be greater than the free volume of cured, modified resin 118. In the present disclosure, a high-free-volume polymer nanoparticle 156 may be described as having Angstrom-level porosity. A high-free-volume polymer nanoparticle 156 may also be described as being formed of a material having a polymeric composition that includes unfilled volume at the ends of the polymer chains that make up the polymeric composition. In a high-free-volume polymer nanoparticle 156, up to 95 percent of the volume of the polymer nanoparticle 156 may be a non-consolidated solid (not shown) and which may enable free volumetric expansion of the high-free-volume polymer nanoparticle 156. A non-consolidated solid may be described as a composition having a single non-solid phase exhibiting minimal stress during volumetric expansion of the composition. FIG. 9A is a schematic illustration of biaxial tension 168 applied to the cured resin mixture 122 of FIG. 9A and illustrating the resulting nanoparticle strain 160 and the resin mixture strain 124 which may be greater than the strain capability of unmodified resin 118 (FIG. 5A). The strain of the resin mixture 122 may be provided by the relatively high dilational capability of the high-free-volume polymer nanoparticles 156.

Figure 10:
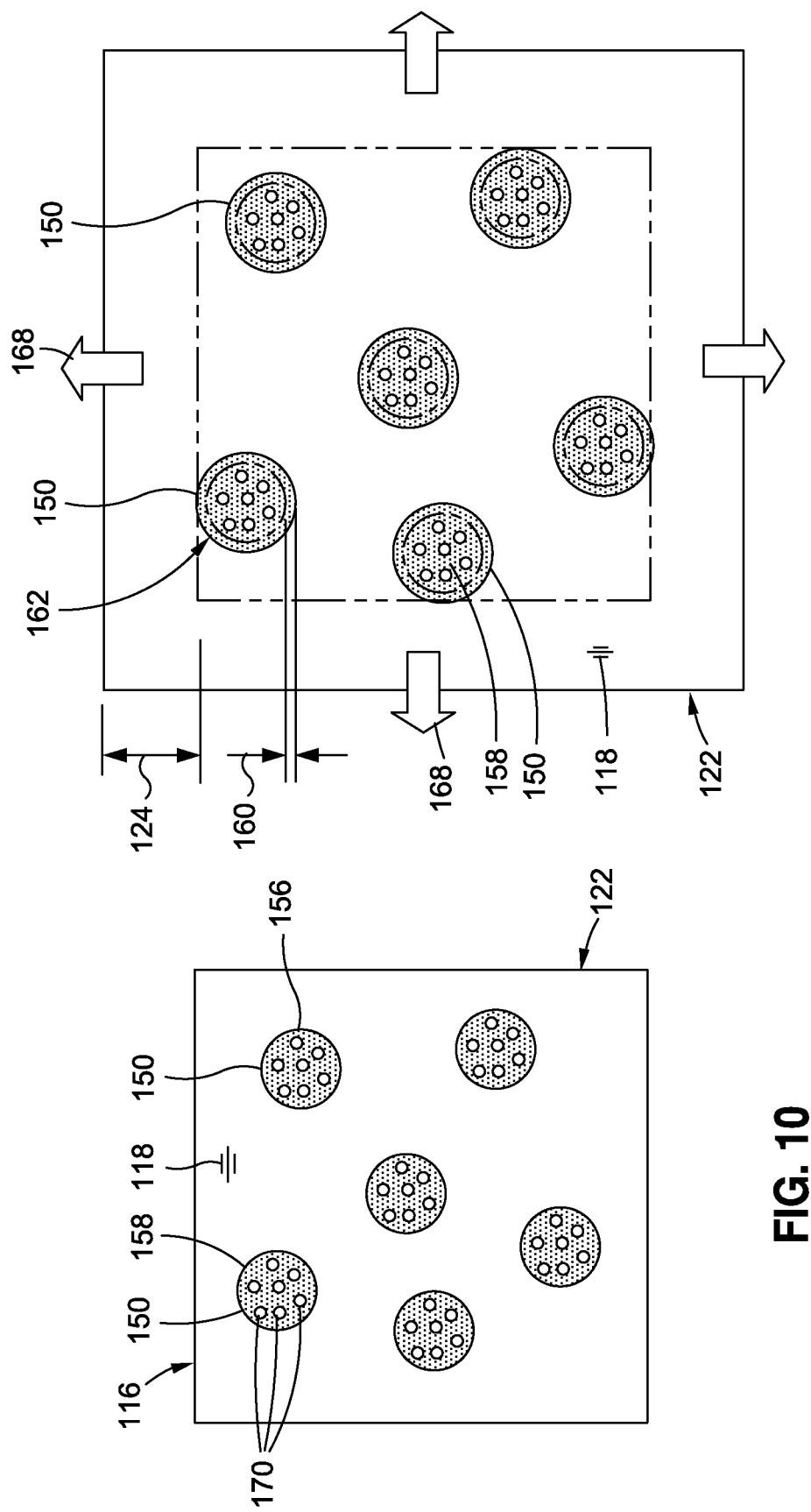
FIG. 10 is a schematic illustration of a cured resin mixture comprising resin containing polymer nanoparticles each having a plurality of pores.

FIG. 10 is a schematic illustration of a unit cell of cured resin mixture 122 including resin 118 containing porous polymer nanoparticles 158 each having a plurality of pores 170. In some examples, the porous polymer nanoparticles 158 may have a nanoparticle porosity that may be greater than the porosity of cured, unmodified resin 118. The porous polymer nanoparticle may contain a single pore 170. In some examples, the single pore 170 may occupy more than 50 percent of the total volume enclosed by the outer surface of the porous polymer nanoparticle 158. However in other examples, a single porous polymer nanoparticle 158 may include a plurality of pores 170. In some examples, the pores 170 may occupy more than 50 percent of the total volume of the porous polymer nanoparticle 158. Alternatively, porous polymer nanoparticles 158 may have a total volume of the pores 170 that may be less than 50 percent of the total volume of the porous polymer nanoparticle 158, and may have a higher porosity than the porosity of unmodified resin 118. Porous polymer nanoparticles 158 may also be a least partially made of a hydrophobic or superhydrophobic material to minimize intrusion of water. Regardless of the porosity level, the porous polymer nanoparticles 158 preferably have a higher distortional capability than unmodified resin 118. FIG. 10A is a schematic illustration of biaxial tension 168 applied to the cured resin mixture 122 of FIG. 10A and illustrating the nanoparticle strain 160 and the resin mixture strain 124, which may be greater than the strain capability of unmodified resin 118 (FIG. 5A).

Figure 11:
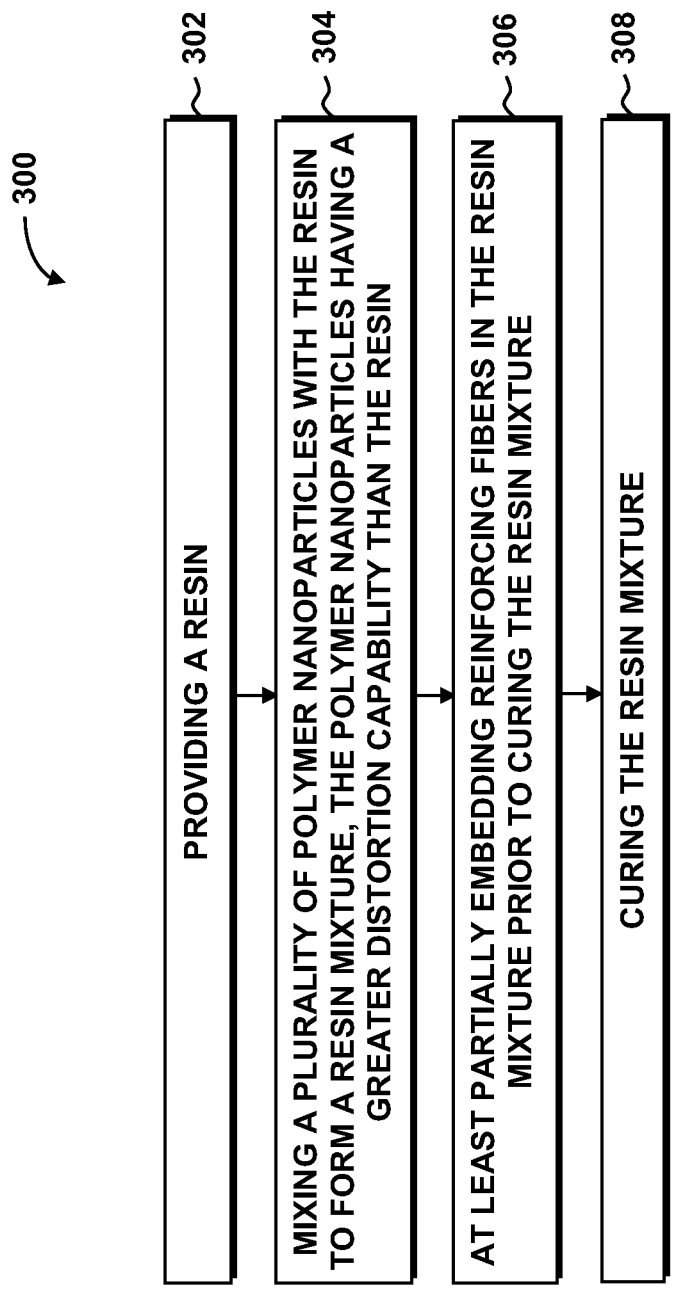
FIG. 11 is a flowchart illustrating one or more operations that may be included in a method of manufacturing a composite structure.

FIG. 11 is a flowchart illustrating one or more operations that may be included in a method 300 of manufacturing a composite structure 100. Step 302 of the method may include providing a resin 118 which may be formed of any one of the above-described thermoplastic materials or thermosetting materials.

Step 304 of the method may include mixing a plurality of high-distortion-capable polymer nanoparticles 150 in the resin 118 to form a resin mixture 122 having improved the strain characteristics. As indicated above, the distortional capability of the high-distortion-capable polymer nanoparticles 150 may be provided by one or more characteristics including, but not limited to, the nature of the polymer backbone 154 of the polymer nanoparticles 150, by high-free-volume polymer nanoparticles 156, and/or by porous polymer nanoparticles 158 having one or more pores 170. The high-distortion-capable polymer nanoparticles 150 may have a greater volumetric distortion capability than the volumetric distortion capability of unmodified resin 118.

High-distortion-capable polymer nanoparticles 150 may be added to resin 118 prior to or during pre-pregging operations. Alternatively, high-distortion-capable polymer nanoparticles 150 may be mixed with liquid resin 118 prior to infusion of resin 118 into a composite layup 102 during a liquid resin infusion process. Even further, high-distortion-capable polymer nanoparticles 150 may be included in a resin film (not shown) that may be laid up between one or more composite plies 104 of a composite layup 102. In a further example, high-distortion-capable polymer nanoparticles 150 may be added to targeted regions of a composite layup 102 to improve the distortional capability of the resin matrix. In a further aspect, polymer nanoparticles having other functionalities may be included with the high-distortion-capability polymer nanoparticles 150. For example, polymer nanoparticles may be added to resin 118 to improve the resin toughness, modulus, strength, coefficient of thermal expansion (CTE), flammability resistance, smoke and toxicity levels, electrical conductivity, and/or corrosion resistance. In addition, polymer nanoparticles may be added to reduce cure shrinkage, heat of reaction, and/or to improve other properties of a composite layup 102 and/or composite structure 100.

Step 306 of the method may include embedding reinforcing fibers 110 in the resin mixture 122 prior to curing the resin mixture 122. As indicated above, reinforcing fibers 110 may be pre-impregnated with a resin mixture 122 containing high-distortion-capability polymer nanoparticles 150. The prepreg fibers 110 may be arranged in any one of a variety of fiber forms including unidirectional tape, woven fabric, braided fibers, or other fiber forms. Alternately, a resin mixture 122 containing polymer nanoparticles 150 may be infused into a dry fiber 110 layup using any one of a variety of resin infusion processes.

Step 308 of the method may include curing the resin mixture 122. In some examples, pressure may be applied to consolidate the composite layup 102 to improve the fiber volume fraction and/or to remove volatiles and/or voids from the composite layup 102 prior to or during cure. Following consolidation, heat and/or pressure may be applied to cure or solidify the resin mixture 122 to form the composite structure 100.

Figure 12:
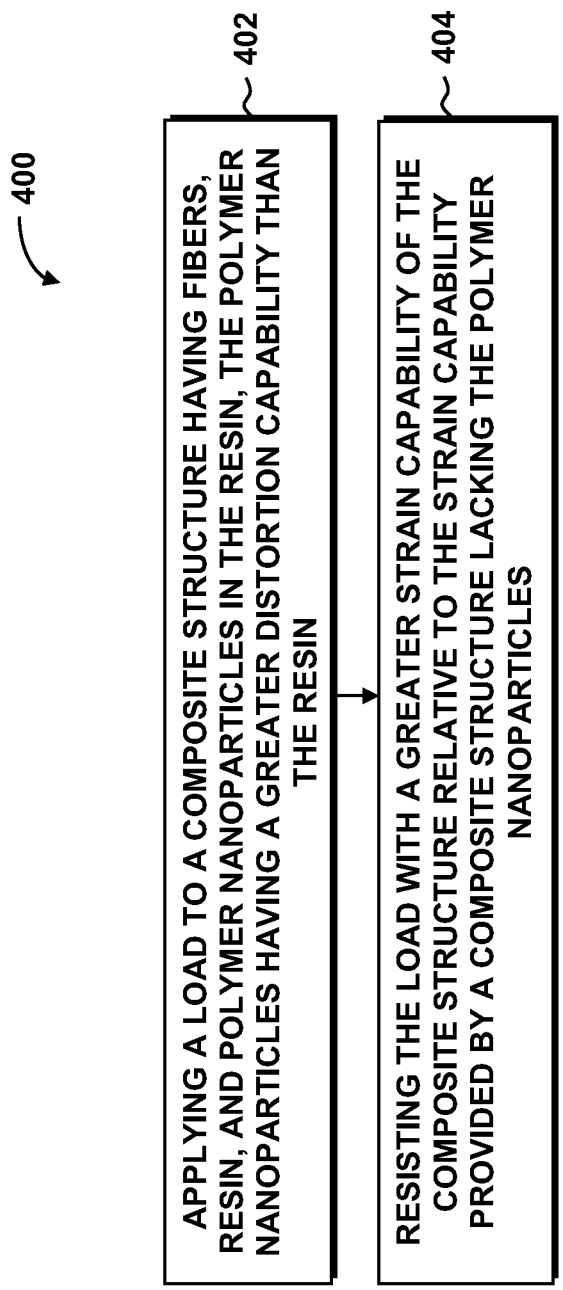
FIG. 12 is a flowchart illustrating one or more operations that may be included in a method of applying a load to a composite structure.

FIG. 12 a flowchart illustrating one or more operations that may be included in a method 400 of resisting a load applied to a composite structure 100. Step 402 of the method may include applying a load to a composite structure 100 having a cured resin mixture 122 containing polymer nanoparticles 150 having high distortional capability. As indicated above, the addition of the high-distortion-capability polymer nanoparticles 150 may directly improve the resin 118 performance by improving the ability of the resin mixture 122 and/or composite structure 100 to contract due to Poisson's ratio, and which may increase the resin strain capability and therefore improve the performance of the composite structure 100. Advantageously, the addition of the high-distortion-capability polymer nanoparticles avoids the need to alter the chemistry of the base resin 118 such that the resin properties including solvent resistance and other properties are unaffected.

Step 404 of the method may include resisting the load on the composite structure 100 with a volumetric strain capability of the resin mixture 122 greater than the volumetric strain capability of unmodified resin 118. In one example, the method may include applying a load along a first axis or first direction 202 of the composite structure 100, and resisting the load with a strain capability of the cured resin mixture 122 greater than the strain capability of a composite structure 100 containing unmodified resin 118. For example, a composite structure 100 may be loaded in uniaxial tension. As a result of the distortional capability of the polymer nanoparticles 150, the uniaxial tension load may result in a tensile strain of the composite structure 100 along the first axis or first direction 202 greater than the tensile strain of a composite structure 100 containing unmodified resin 118. The method may further include resisting the uniaxial tension load with a compressive strain along a second axis or second direction 204 oriented transverse to the first direction 202. The compressive strain along the second direction 204 of a composite structure 100 containing polymer nanoparticles may be greater than the compressive strain of a composite structure 100 containing unmodified resin 118.

In some examples, the method may include coupling a plurality of polymer nanoparticles 200 to one or more reinforcing filaments 112 to act as spacers to prevent the reinforcing filaments 112 from touching one another and to control the permeability of the fibers 120 (FIG. 4). The polymer nanoparticles 200 may be applied to reinforcing filaments 112 as the reinforcing filaments 112 are drawn from a fiber forming apparatus (not shown). In other examples, polymer nanoparticles 200 may be applied to reinforcing filaments 112 as the fiber tows 110 are formed into unidirectional tape, unidirectional sheet, woven fabric, braided fibers, and other fiber forms. Polymer nanoparticles 200 may also be coupled to or applied to one or more reinforcing filaments 112 during prepregging operations wherein resin 118 is applied to fiber tows, unidirectional tape, woven fabric, braided fibers, and other fiber forms.

In some examples, polymer nanoparticles 200 may be melt-fused to the reinforcing filaments 112. For example, the polymer nanoparticles 200 may be formed of thermoplastic material or the polymer nanoparticles 200 may be configured as core-sheath nanoparticles (not shown) each having a thermoplastic sheath surrounding a core. The reinforcing filaments 112 and/or the sheaths of the polymer nanoparticles may be heated to a temperature causing the outer portion of the core-sheath nanoparticles to bond or melt-fuse to the reinforcing filaments 112 when the core-sheath nanoparticles come into contact with the reinforcing filaments 112

Illustrative embodiments of the disclosure may be described in the context of a method (not shown) of manufacturing and/or servicing an aircraft, spacecraft, satellite, or other aerospace component. Pre-production, component manufacturing, and/or servicing may include specification and design of aerospace components and material procurement. During production, component and subassembly manufacturing, and system integration of aerospace components takes place. Thereafter, the aircraft, spacecraft, satellite, or other aerospace component may go through certification and delivery in order to be placed in service.

In one example, aerospace components produced by the manufacturing and servicing method may include an airframe with a plurality of systems and an interior. Examples of the plurality of systems may include one or more of a propulsion system, an electrical system, a hydraulic system, and an environmental system. Any number of other systems may be included. Although an aerospace example is shown, different illustrative embodiments may be applied to other industries, such as the automotive industry.

Apparatuses and methods embodied herein may be employed during at least one of the stages of an aerospace component manufacturing and/or servicing method. In particular, a composite structure 100 (e.g., FIG. 1), a coating, an injection-molded plastic, and/or an adhesive may be manufactured during any one of the stages of the aerospace component manufacturing and servicing method. For example, without limitation, a composite structure may be manufactured during at least one of component and subassembly manufacturing, system integration, routine maintenance and service, or some other stage of aircraft manufacturing and servicing. Still further, a composite structure may be used in one or more structures of aerospace components. For example, a composite structure may be included in a structure of an airframe, an interior, or some other part of an aircraft, spacecraft, satellite, or other aerospace component.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composite structure, comprising:
a cured resin;
a plurality of reinforcing fibers arranged as a stack of composite plies, the reinforcing fibers in each composite ply formed of reinforcing filaments and embedded within the cured resin such that the cured resin extends through an entire thickness of the composite structure, at least some of the reinforcing fibers located immediately adjacent to one another and being parallel to one another;
a plurality of polymer nanoparticles included in the cured resin at locations of the composite structure limited to locations between the reinforcing filaments of one or more reinforcing fibers in a composite ply of the composite structure, and all remaining locations of the composite structure containing reinforcing fibers in cured resin being devoid of all polymer nanoparticles, at least some of the polymer nanoparticles having multiple pores at least prior to the initial application of a load to the composite structure;
the cured resin containing polymer nanoparticles defining a cured resin mixture;
the cured resin mixture having a higher failure strain than cured, unmodified resin lacking the polymer nanoparticles;

the failure strain of the cured resin mixture being the strain at which microcracking occurs in the resin when a composite structure containing reinforcing fibers embedded in the cured resin mixture is loaded in tension along a direction parallel to a lengthwise direction of the parallel reinforcing fibers; and
the failure strain of the cured, unmodified resin being the strain at which microcracking occurs in the resin when a composite structure containing reinforcing fibers embedded in the cured, unmodified resin is loaded in tension along a direction parallel to a lengthwise direction of the parallel reinforcing fibers.

2. The composite structure of claim 1, wherein:
the reinforcing fibers have at least one of the following configurations: fiber tows, unidirectional tape, woven fabric, and/or braided fibers.

3. The composite structure of claim 1, wherein:
the polymer nanoparticles are generally spherical.

4. The composite structure of claim 1, wherein:
the polymer nanoparticles have a particle cross-sectional width of 10-200 nanometers.

5. The composite structure of claim 1, wherein:
the polymer nanoparticles constitute no less than 10 percent by volume of the resin mixture.

6. The composite structure of claim 1, wherein:
the polymer nanoparticles constitute up to 75 percent by volume of the resin mixture.

7. The composite structure of claim 1, wherein:
the plurality of polymer nanoparticles are formed of thermoplastic material comprising at least one of the following: acrylics, fluorocarbons, polyamides, polyolefins, polyesters, polycarbonates, polyurethanes, polyaryletherketones, polyetherimides, polyethersulfone, polysulfone, and polyphenylsulfone;
the resin is formed of thermosetting material comprising at least one of the following: polyurethanes, phenolics, polyimides, sulphonated polymer, a conductive polymer, benzoxazines, bismaleimides, cyanate esthers, polyesters, epoxies, and silsesquioxanes.

8. The composite structure of claim 1, wherein:
at least some of the polymer nanoparticles are contained within a sheath.

9. The composite structure of claim 1, wherein:
the reinforcing filaments each have a filament cross-sectional width or diameter of 5-30 microns.

10. The composite structure of claim 8, wherein:
the sheath is formed of thermoplastic material.

11. The composite structure of claim 1, wherein:
at least some of the polymer nanoparticles in the resin mixture have a particle cross-sectional width that is different than the particle cross-sectional width of other polymer nanoparticles in the resin mixture.

12. The composite structure of claim 1, wherein:
the polymer nanoparticles have a non-spherical shape including one of an oblong shape, an elliptical shape, a cube shape, a rectangular shape, or a pyramid shape.

13. The composite structure of claim 1, wherein:
the reinforcing filaments are formed of at least one of the following materials: carbons, silicon carbide, boron, ceramic, metallic material, alumino-borosilicate glass, alumino silicate glass, pure silica, borosilicate glass, and optical glass.

14. The composite structure of claim 1, wherein:
the composite plies are configured as unidirectional plies.

15. The composite structure of claim 14, wherein:
the reinforcing fibers in at least one of the unidirectional plies are oriented non-parallel to the reinforcing fibers in another one of the unidirectional plies.

16. A method of forming a composite structure, comprising:
providing a resin;
embedding a plurality of reinforcing fibers in the resin to form a composite layup arranged as a stack of composite plies in which the resin extends through an entire thickness of the composite layup, the reinforcing fibers in each composite ply formed of reinforcing filaments, at least some of the reinforcing fibers within the composite layup being located immediately adjacent to one another and being parallel to one another;
applying a plurality of polymer nanoparticles to the resin at locations of the composite structure limited to locations between the reinforcing filaments of one or more reinforcing fibers in a composite ply, all remaining locations of the composite layup being devoid of all polymer nanoparticles; at least some of the polymer nanoparticles have multiple pores at least prior to the initial application of a load to the composite structure;
curing the resin to form the composite structure, the cured resin containing polymer nanoparticles defining a cured resin mixture;
wherein the cured resin mixture of the composite structure has a higher failure strain than cured, unmodified resin lacking the polymer nanoparticles;
the failure strain of the cured resin mixture being the strain at which microcracking occurs in the resin when a composite structure containing reinforcing fibers embedded in the cured resin mixture is loaded in tension along a direction parallel to a lengthwise direction of the parallel reinforcing fibers; and
the failure strain of the cured, unmodified resin being the strain at which microcracking occurs in the resin when a composite structure containing reinforcing fibers embedded in the cured, unmodified resin is loaded in tension along a direction parallel to a lengthwise direction of the parallel reinforcing fibers.

17. A method of resisting a load applied to a composite structure, comprising the steps of:
applying a load to a composite structure having a cured resin including a plurality of reinforcing fibers arranged as a stack of composite plies, the reinforcing fibers in each composite ply formed of reinforcing filaments embedded within the cured resin such that the cured resin extends through an entire thickness of the composite structure, at least some of the reinforcing fibers located immediately adjacent to one another and being parallel to one another, the composite structure having a plurality of polymer nanoparticles included in the cured resin at locations of the composite structure limited to locations between the reinforcing filaments of one or more reinforcing fibers in a composite ply, and all remaining locations of the composite structure containing reinforcing fibers in cured resin being devoid of all polymer nanoparticles, the cured resin containing polymer nanoparticles defining a cured resin mixture, at least some of the polymer nanoparticles have multiple pores at least prior to the initial application of the load to the composite structure;
resisting the load with a failure strain of the cured resin mixture of the composite structure higher than the failure strain of cured, unmodified resin lacking the polymer nanoparticles;
wherein the failure strain of the cured resin mixture being the strain at which microcracking occurs in the resin when a composite structure containing reinforcing fibers embedded in the cured resin mixture is loaded in tension along a direction parallel to a lengthwise direction of the parallel reinforcing fibers; and
the failure strain of the cured, unmodified resin being the strain at which microcracking occurs in the resin when a composite structure containing reinforcing fibers embedded in the cured, unmodified resin is loaded in tension along a direction parallel to a lengthwise direction of the parallel reinforcing fibers.

18. The method of claim 17, wherein the steps of applying the load and resisting the load include:
applying the load along a first axis of the composite structure; and
resisting the load with the failure strain of the cured resin mixture of the composite structure along the first axis higher than the failure strain of the cured, unmodified resin lacking the polymer nanoparticles.

19. The method of claim 18, wherein the step of applying the load and resisting the load includes:
applying a tension load along the first axis; and
resisting the load with a tensile strain of the cured resin mixture along the first axis higher than the tensile strain of the cured, unmodified resin lacking the polymer nanoparticles.

20. The method of claim 19, wherein the composite structure has a second axis oriented orthogonal to the first axis, the step of resisting the load further including:
resisting the load with a compressive strain of the cured resin mixture along the second axis higher than the compressive strain of the cured, unmodified resin lacking the polymer nanoparticles.

* * * * *